United States Patent Office 3,071,609
Patented Jan. 1, 1963

3,071,609
PHENYLPHOSPHONATES AND PHOSPHONITES
John Robert Campbell, St. Louis, and Roger E. Hatton, Kirkwood, Mo., assignors to Monsanto Chemical Company, St. Louis, Mo., a corporation of Delaware
No Drawing. Filed Mar. 17, 1961, Ser. No. 96,386
11 Claims. (Cl. 260—461)

This invention relates to new phenylphosphonates and phenylphosphonites represented by the structure

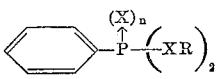

where X is selected from oxygen and sulfur, R is selected from naphthyl and polyfluoroalkyl radicals and radicals of the structure —R'(X—R')$_m$H where R' is phenyl, X is oxygen or sulfur, $n$ is 0 or 1 and $m$ is a number from 1 to 5.

The preparation of the compounds of this invention is illustrated in the following non-limiting examples wherein parts are parts by weight unless otherwise stated.

Example 1

Into a suitable reaction vessel fitted with a reflux head and condenser and having means for the addition and removal of solids and liquids, agitation means, means for the input of heat and means for measuring temperature in the liquid phase there was charged a solution of 57.7 parts of 1-naphthol in 100 ml. of pyridine and 39 parts of phenylphosphoryl dichloride. The resulting mixture was heated to and maintained at 115° C., with agitation, for about 4 hours and then allowed to cool to room temperature. After cooling, the reaction mass was extracted with ether and the extract was washed with water, dried and distilled to yield 74 parts of di-1-naphthyl phenylphosphonate, a very viscous yellow oil (B.P. 265–270° @ 0.5 mm.) which very slowly crystallized on standing to white crystals melting at 79–80° C.

Example 2

Into a suitable reaction vessel as described above containing a solution of 186.2 parts of m-phenoxyphenol in 100 ml. of pyridine there was rapidly charged, with agitation, 89.5 parts of dichlorophenylphosphine which induced an exothermic reaction. The reaction mass was then heated at 150–160° C. for 4 hours then at 170–180° C. for 4 hours, cooled, water was added and two layers separated. The organic layer was decanted, washed with water, dried and distilled to give di-m-phenoxyphenyl phenylphosphonite, a yellow oil (B.P. 260–275° C. @ 0.45 mm.).

Similarly sulfur-containing compounds RSH can be substituted for those used above (i.e. ROH). The compounds RSH can be reacted with phenylphosphoryl dihalides to produce phenyl dithiophosphonates; with dihalophenylphosphines to produce phenyldithiophosphonites; or with phenylthiophosphoryl dihalides to produce phenyltrithiophosphonates. Also the compounds ROH can be reacted with the sulfur-containing dihalides mentioned to produce phenyl thiophosphonates. Any dihalides can be used but those of chlorine and bromine are preferred because of their reactivity and availability.

Generally following the procedure described above other phenylphosphonates and phosphonites of this invention can be prepared, illustrative examples of which are given below.

| Example No. | Reactants | Product | B.P. |
|---|---|---|---|
| 3 | m-phenoxyphenol, phenyl-phosphorous oxychloride. | Di-m-phenoxyphenyl phenyl-phosphonate. | 276–278° C. @ 0.4 mm. |
| 4 | 1H, 1H, 7H-tridecyl-fluoro-1-heptyl alcohol, phenylphosphorus dichloride. | Di-1H, 1H, 7H-tridecylfluoro-1-heptyl phenylphosphonate. | 155–165° C. @ 0.4 mm. |
| 5 | 1H,1H,9H-hexadecyl-fluoro-1-nonyl alcohol, phenylphosphorus dichloride. | Di-1H,1H,9H-hexadecylfluoro-1-nonyl phenyl-hosphonate. | 178–190° C. @ 0.45 mm. |
| 6 | Product of Example 2 and sulphur heated in benzene. | Di-m-phenoxy-phenyl phenylthiophosphonate. | 275–287° C. @ 0.45 mm. |

Additional examples of compounds within the scope of this invention which can be prepared as above are di-1-naphthyl phenylphosphonite, other polyfluoroalkyl phenylphosphonates and phosphonites, e.g.

di-(1H,1H,3H-tetrafluoro-1-propyl)phenylphosphonate,
di-(1H,1H,3H-tetrafluoro-1-propyl)phenylphosphonite,
di-(1H,1H,5H-octafluoro-1-pentyl)phenylphosphonate,
di-(1H,1H,5H-octafluoro-1-pentyl)phenylphosphonite,
di-(1H,1H,11H-eicosylfluoro-1-undecyl)phenylphosphonate,
di-(1H,1H,11H-eicosofluoro-1-undecyl)phenylphosphonite, etc.;

other phenyl phenylphosphonates and phosphonites containing polyphenyl ether radicals, e.g. other compounds represented by the structure

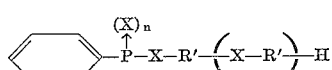

where X, $n$, R' and $m$ have their aforedescribed significance, e.g.

di-p-phenoxyphenyl phenylphosphonate,
di-p-phenoxyphenyl phenylphosphonite,
di-p-phenylmercaptophenyl phenylphosphonate,
di-p-phenylmercaptophenyl phenylphosphonite,
di-o-phenoxyphenyl phenylphosphonate,
di-o-phenoxyphenyl phenylphosphonite,
di-o-phenylmercaptophenyl phenylphosphonate,
di-o-phenylmercaptophenyl phenylphosphonite,
di-[m-(m-phenoxy)phenoxyphenyl] phenylphosphonate,
di-[m-(m-phenoxy)phenoxyphenyl] phenylphosphonite,
di-[m-(m-phenylmercapto)phenylmercaptophenyl] phenylphosphonate,
di-[m-(m-phenylmercapto)phenylmercaptophenyl] phenylphosphonite,
di-[o-(o-phenoxy)phenoxyphenyl] phenylphosphonate,
di-[o-(o-phenoxy)phenoxyphenyl] phenylphosphonite,
di-[o-(o-phenylmercapto)phenylmercaptophenyl] phenylphosphonate,
di-[o-(o-phenylmercapto)phenylmercaptophenyl] phenylphosphonite,
di-[p-(p-phenoxy)phenoxyphenyl] phenylphosphonate,
di-[p-(p-phenoxy)phenoxyphenyl] phenylphosphonite, di-[p-(p-phenylmercapto)phenylmercaptophenyl] phenylphosphonate,
di-[p-(p-phenylmercapto)phenylmercaptophenyl] phenylphosphonite,
di-[m-(p-phenoxy)phenoxyphenyl] phenylphosphonate,
di-[m-(p-phenoxy)phenoxyphenyl] phenylphosphonite,
di-[m-(m-phenoxyphenoxy)phenoxyphenyl] phenylphosphonate,
di-[m-(m-phenylmercaptophenylmercapto)phenylmercaptophenyl] phenylphosphonate,
di-[m-(m-phenylmercaptophenylmercapto)phenylmercaptophenyl] phenylphosphonite.

The compounds of this invention are primarily useful as functional fluids, even at high temperatures of the order of 700° F., which are used as force transmission fluids for the transmission of pressure, power or torque in fluid pressure or torque actuated mechanisms, such as for example, the "hydraulic fluids" used for transmitting fluid pressure to the ram cylinders of hydraulic presses or in devices for the absorption and dissipation of energy such as shock absorbers or recoil mechanisms, or for transmission of torque through torque converter types of fluid couplings. The functional fluids of this invention can also be used as damping fluids which are the liquid compositions used for damping mechanical vibrations or resisting other rapid mechanical movements. The functional fluids of this invention are also suitable for use as synthetic lubricants between relatively moving mechanical parts, as bases for synthetic greases, as component parts of mixtures used as functional fluids and as the liquid material in the filters of air conditioning systems. When used as functional fluids our phosphonates and phosphonites can be used per se or they can be used in combination with various addition agents, such as oxidation inhibitors, rust inhibitors, anti-foaming agents, detergents, viscosity index improvers compatible therewith, etc., whenever specific uses require such addition agents. In some cases the compounds of the invention are solids at room temperature and accordingly are suitable as functional fluids at temperatures above their melting point.

As indicative of the outstanding thermal stability of the compounds of this invention there is tabulated below the weight loss of various phosphonates and phosphonites of this invention when heated at 700° F. for 10 hours in a tube blanketed with nitrogen.

| Compound: | Percent weight loss |
|---|---|
| Di-m-phenoxyphenyl phenylphosphonate | 1.5 |
| Di-m-phenoxyphenyl phenylthiophosphonate | 1.6 |
| Di-1-naphthyl phenylphosphonate | 3.4 |
| Di-1H,1H,7H-tridecylfluoro-1-heptyl phenylphosphonate | 1.1 |
| Di - 1H,1H,9H - hexadecylfluoro - 1 - nonyl phenylphosphonate | 2.9 |
| Di-m-phenoxyphenyl phenylphosphonite | 0.8 |

In addition to being useful as functional fluids many of the compounds of this invention are also useful as pesticides, e.g. di-1-naphthyl benzene phosphonate and di - 1,1,7 - trihydroperfluoroheptyl benzene phosphonate when used as a contact insecticide on the two-spotted spider mite in the mobile, resting and ova stages at concentrations of the active ingredient of 0.1% each gave 100% kill. In addition to being a very effective contact pesticide against the two-spotted spider mite di-1-naphthyl benzene phosphonate can also be used as a pesticide against allied classes of anthropoids, e.g. spider and centipedes as well as true Hexapoda, i.e. six-legged invertebrates; in a contact application the latter named compound gave a 30% kill of *plum cerrculio topica* at a concentration of active ingredient of 1.0% and also di-m-phenoxyphosphonate in a contact application at a concentration of the active ingredient of 1.0% gave a 20% kill of *plum currculio topica*. From the above results it is evident that the compounds of this invention are useful as pesticides in addition to their use as functional fluids.

While our invention has been described by reference to various specific examples and embodiments it is understood that said invention is not limited thereto and that it can be variously practiced within the scope of the following claims.

The embodiments of the invention in which an exclusive property or privilege is claimed are defined as follows.

We claim:
1. A compound of the structure

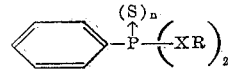

where R is selected from polyfluoroalkyl radicals and radicals of the structure, —R'(X—R')ₘH, R' is phenyl, X is oxygen or sulfur, $n$ is selected from 0 and 1 and $m$ is a number from 1 to 5.

2. A phenylphosphonate of claim 1.
3. A phenylphosphonite of claim 1.
4. A compound of the structure

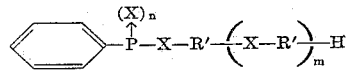

where X is selected from oxygen and sulfur, $n$ is selected from 0 and 1, $m$ is a number from 1 to 5 and R' is phenyl.

5. Di-m-phenoxyphenyl phenylphosphonate.
6. Di-m-phenoxyphenyl phenylthiophosphonate.
7. Di-m-phenoxyphenyl phenylphosphonite.
8. Di-1,1,7-trihydroperfluoroheptyl phenylphosphonate.
9. Di-1,1,9-trihydroperfluorononyl phenylphosphonate.
10. A di-perfluoroalkyl phenylphosphonate.
11. A di-perfluoroalkyl phenylphosphonite.

References Cited in the file of this patent
UNITED STATES PATENTS

| 2,392,841 | Detrick et al. | Jan. 15, 1946 |
| 2,666,078 | Fergusen | Jan. 12, 1954 |
| 2,728,806 | Morris et al. | Dec. 27, 1955 |
| 2,768,193 | Gilbert | Oct. 23, 1956 |
| 2,828,195 | Yust et al. | Mar. 25, 1958 |
| 2,906,765 | Jex et al. | Sept. 29, 1959 |
| 2,927,014 | Goyette | Mar. 1, 1960 |
| 2,993,859 | Watson | July 25, 1961 |